Aug. 7, 1923.                                                         1,464,009
O. A. LOEW
SPARE TIRE CARRIER AND LOCK
Filed Oct. 31, 1921
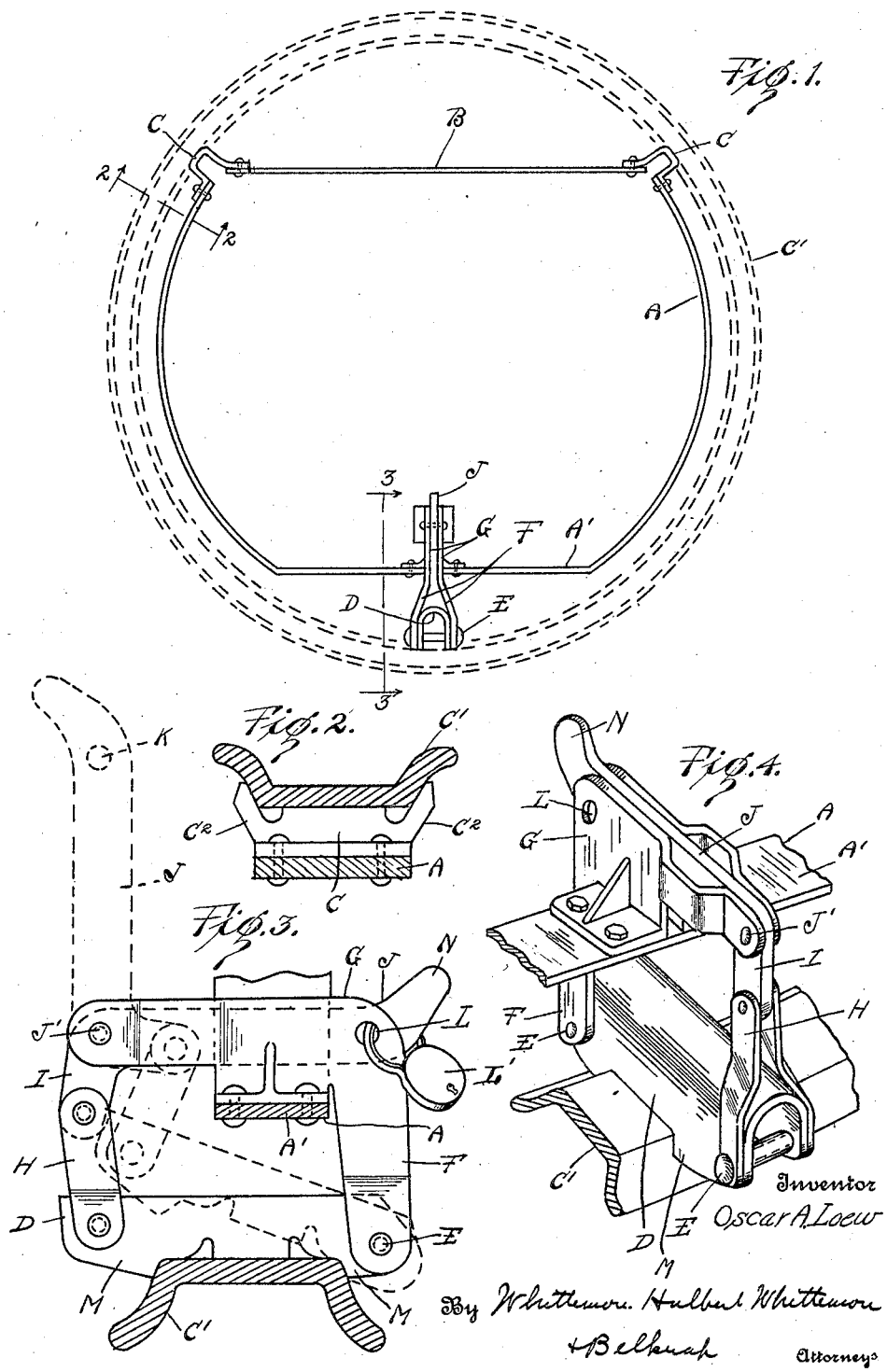
Inventor
Oscar A. Loew
By Whittemore, Hulbert Whittemore
+ Belknap      Attorneys Patented Aug. 7, 1923.

1,464,009

UNITED STATES PATENT OFFICE.

OSCAR A. LOEW, OF HIGHLAND PARK, MICHIGAN, ASSIGNOR TO HARWICH STAMPING COMPANY, OF SPRINGWELLS, MICHIGAN, A CORPORATION OF MICHIGAN.

SPARE-TIRE CARRIER AND LOCK.

Application filed October 31, 1921. Serial No. 511,665.

*To all whom it may concern:*

Be it known that I, OSCAR A. LOEW, a citizen of the United States of America, residing at Highland Park, in the county of Wayne and State of Michigan, have invented certain new and useful Improvements in Spare-Tire Carriers and Locks, of which the following is a specification, reference being had therein to the accompanying drawings.

This invention relates to a spare tire carrier and relates more particularly to a carrier for a spare tire or demountable rim having a provision for locking said tire or rim against removal.

It is the object of the invention to provide a carrier for a spare tire or demountable rim having means for seating said tire or rim at a plurality of relatively fixed points and furthermore having a seat adjustable radially of the tire or rim into or out of locking engagement with the same.

A preferred embodiment of the invention is hereinafter described and is illustrated in the accompanying drawings wherein:—

Figure 1 is a view of the improved tire carrier in elevation showing in dash lines a rim engaging said carrier.

Figure 2 is a cross section on line 2—2 of Figure 1 showing one of the relatively fixed seats for the rim.

Figure 3 is a cross section on line 3—3 of Figure 1 showing the adjustable locking seat for the rim.

Figure 4 is a perspective view of the construction shown in Figure 3.

In these views, the reference character A designates a circularly curved metal bar having a rectilinear portion A′ preferably at its bottom, and having a parallel bar B connecting its free ends. The connection between the member A and the bar B is established by a pair of metal brackets C riveted respectively to the bars A and B and outwardly projecting to form seats for the rim C′. To retain said rim the seats C are formed at each end with outwardly extending prongs C² for engagement with the sides of the rim. The horizontal portion A′ of the carrier A supports a third seat D which is adjustable radially with relation to the rim C′, one end of the seat D being pivoted at E upon a pair of arms F integrally extending outwardly from a bracket G secured to the tire carrier, the other end of said adjustable seat being connected by a pair of links H to a short arm I of a bell crank lever J pivoted at J′ upon said bracket G. The bracket G comprises parallel portions between which the lever J engages in the position of use of the seat D, said lever having adjacent its free end an aperture K registrable with apertures L in the bracket G when disposed between the parallel portions of said bracket. By engaging an ordinary pad lock L′ with the apertures K and L of said lever and bracket, the adjustable seat is secured in engagement with the rim. As is best seen in Figure 3, said seat D is of a channel shape, and is formed transversely of its channel with lugs M (see Fig. 4) engaging at each side of the rim to prevent removal thereof when the rim is engaged with said seat. N indicates a bent end portion of the lever J forming an operating handle for said lever. When the lever J is swung inwardly, as indicated in dash lines in Figure 3, the seat B is shifted radially toward the center of the tire carrier so as to permit a ready removal of the detachable rim.

What I claim as my invention is:

1. In a device of the character described, the combination with a plurality of relatively fixed seats for a tire or rim, of a complementary seat adjustable to or from said fixed seats, a support for one end of said adjustable seat, a bell crank mounted upon the other end of said support, a link connecting one arm of said bell crank to the other end of the adjustable seat and means for locking the other arm of said bell crank in a fixed relation to said support.

2. In a device of the class described, the combination with a plurality of relatively fixed seats for a tire or rim, of a complementary seat adjustable to or from said fixed seats, a support for said adjustable seat, a member pivotally mounted upon said support, a connection between said member and said adjustable seat for actuating the latter, and means for locking said member to said support to retain the adjustable seat in adjusted position.

3. In a device of the class described, the combination with a plurality of relatively fixed seats for a tire or rim, of a complementary seat adjustable to or from said fixed seats, a support for said adjustable seat, a lever mounted pivotally upon said support, a connection between said lever and said adjustable seat, said lever and said support having openings therein, and means engageable with the openings in said lever and said support for locking said lever to said support to retain said adjustable seat in adjusted position.

4. In a device of the class described, the combination with a plurality of relatively fixed seats for a tire or rim, of a complementary seat adjustable to or from said fixed seats, a support for said adjustable seat connected to the seats aforesaid, a member pivotally mounted upon said support, a connection between said member and said adjustable seat, and means for locking said member to said support to retain said adjustable seat in adjusted position.

5. In a device of the class described, the combination with a plurality of relatively fixed seats for a tire or rim, of a connection between said seats, a complementary seat adjustable to or from said fixed seats, a substantially U-shaped support for said adjustable seat, said support being connected to the seats aforesaid, a lever pivotally mounted upon said support, a connection between said lever and said adjustable seat, and means for locking said lever to said support to retain said adjustable seat in adjusted position.

In testimony whereof I affix my signature.

OSCAR A. LOEW.